United States Patent
Gupta et al.

(10) Patent No.: US 8,934,598 B2
(45) Date of Patent: Jan. 13, 2015

(54) INTEGRATED VIDEO EQUALIZER AND JITTER CLEANER

(71) Applicant: Mindspeed Technologies, Inc., Newport Beach, CA (US)

(72) Inventors: Atul Krishna Gupta, Aliso Viejo, CA (US); Ryan Suresh Latchman, Irvine, CA (US); Nicolas Alain Paul Nodenot, Villeneuve Loubet (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 35 days.

(21) Appl. No.: 13/857,876

(22) Filed: Apr. 5, 2013

(65) Prior Publication Data

US 2013/0329130 A1 Dec. 12, 2013

Related U.S. Application Data

(60) Provisional application No. 61/621,933, filed on Apr. 9, 2012.

(51) Int. Cl.
*H04L 7/00* (2006.01)
*H04N 5/21* (2006.01)
*H04L 25/03* (2006.01)

(52) U.S. Cl.
CPC . *H04N 5/21* (2013.01); *H04L 25/03* (2013.01)
USPC .......................................... 375/371

(58) Field of Classification Search
CPC ................... H04L 25/03; H04N 5/21
USPC .......................................... 375/371
See application file for complete search history.

(56) References Cited

U.S. PATENT DOCUMENTS

| | | | |
|---|---|---|---|
| 4,004,226 A * | 1/1977 | Qureshi et al. | 375/231 |
| 4,849,998 A | 7/1989 | Poklemba | |
| 5,194,828 A | 3/1993 | Kato et al. | |
| 5,666,170 A * | 9/1997 | Stewart | 348/726 |
| 6,111,712 A | 8/2000 | Vishakhadatta et al. | |
| 7,463,680 B2 * | 12/2008 | Buckwalter et al. | 375/233 |
| 7,978,012 B2 | 7/2011 | Wood | |
| 2005/0186918 A1 | 8/2005 | Ramet et al. | |

(Continued)

OTHER PUBLICATIONS

Analog & Power, "An Introduction to clock distribution circuits", Alexander Pakosta, Texas Instruments, 2 pages, date unknown.

(Continued)

*Primary Examiner* — Juan A Torres
(74) *Attorney, Agent, or Firm* — Weide & Miller, Ltd.

(57) ABSTRACT

An integrated system for adaptive equalization and jitter reduction of a video signal that includes an adaptive equalizer and a jitter cleaner located on one integrated circuit within a single package. An adaptive equalizer applies frequency specific signal modification to the received signal. A bit rate detector determines a bit rate of the video signal or the equalized signal. The jitter cleaner couples to the adaptive equalizer output and processes the equalized signal to reduce jitter in the equalized signal. A multiplexer receives the equalized signal and the jitter cleaner output and, responsive to a control signal, outputs either the equalized signal or the jitter cleaner output signal. A status monitor may optionally be included to compare the detected bit rate to a bit rate threshold, and a responsive to the comparing activate or deactivate the jitter cleaner and output either the equalized signal or jitter cleaner output.

21 Claims, 5 Drawing Sheets

(56) References Cited

U.S. PATENT DOCUMENTS

| | | | |
|---|---|---|---|
| 2006/0001494 | A1 | 1/2006 | Garlepp et al. |
| 2008/0111597 | A1 | 5/2008 | Cranford et al. |
| 2008/0265998 | A1 | 10/2008 | Wood |
| 2008/0290953 | A1 | 11/2008 | Sandner et al. |
| 2009/0141774 | A1 | 6/2009 | Araki et al. |
| 2009/0244375 | A1 | 10/2009 | Moehlmann et al. |
| 2011/0032013 | A1 | 2/2011 | Nelson et al. |
| 2012/0038400 | A1 | 2/2012 | Talaga, Jr. |
| 2012/0068866 | A1* | 3/2012 | Robinson ............ 341/118 |
| 2012/0280735 | A1* | 11/2012 | Zhang et al. ............ 327/184 |

OTHER PUBLICATIONS

Texas Instruments, Application Report, "Using the CDCL6010 as a Frequency Synthesizer and Jitter Cleaner", Madhu Balasubramanian, SLLA259-Mar. 2007, Copyright © 2007, Texas Instruments Incorporated, 15 pages.

CDC7005, "3.3-V High Performance Clock Synthesizer and Jitter Cleaner", SCAS685J-Dec. 2002-Revised Jul. 2008, Copyright © 2008, Texas Instruments Incorporated, 33 pgs.

* cited by examiner

INTEGRATED VIDEO EQUALIZER AND JITTER CLEANER

1. PRIORITY CLAIM

This application claims priority to and the benefit of U.S. Provisional Application No. 61/621,933 filed Apr. 9, 2012 entitled Integrated Video Equalizer and Jitter Cleaner.

2. FIELD OF THE INVENTION

This innovation relates to video signal processing and in particular to video signal equalization and jitter reduction.

3. RELATED ART

Video processing equipment is commonly used in numerous industries. Video signals representing video images typically originate at a source and must be sent to processing equipment or a display screen for viewing. As is understood, transmission of an electrical signal over a channel, such as coaxial cable or twisted pair cable, leads to degradation of the electrical signal. The signals typically comprise pulses, which may be converted to an analog representation. In video applications, this degradation is significant due to the frequency required to support video applications, which may be in the gigahertz range. Video broadcast equipment makers continue to use long reaches of coaxial cabling to route ever increasing speeds of serial digital data from a transmitter to a receiver. Losses associated with the coaxial cable (channel) have necessitated frequency dependent gain for signal recovery (also known as equalization). For example, during transmission high frequencies are typically attenuated to a larger degree than lower frequencies and the transfer function of the channel will thus affect the received signal. As a result of the degradation, the recover or processing of the signal at the receiver may result in unacceptably high bit error rates or other unwanted signal anomalies.

To address the frequency specific signal degradation when processing or displaying the video image, a video equalizer at the receiver is utilized. The equalizer is configured to adjust the frequency specific attenuation of the received signal resulting from the channel. Equalization alone has been an effective tool to meet specification for link reaches up to 30 dB loss at half the clock rate. Equalization technology however does have limitations in its ability to provide a reliable signal for downstream elements as channel length and frequencies increase. This is due to imperfect matching of the channel (transmission line) and a reduction of signal to noise ratio as the video data gets attenuated. These non-idealities manifest as an increase of jitter presented to downstream elements such as FPGAs.

In addition, if cross-point switches are part of the signal path, jitter may be introduced into the signal. The jitter may affect the timing, amplitude, phase, or any combination thereof. For example, at 3 Gb/s and greater signal frequencies and for long reach channel lengths, random jitter and deterministic jitter may be introduce into the signal.

To alleviate this additional signal degredation, system vendors have added a separate and discrete reclocker in their design so that a low jitter signal could be presented to downstream signal processing components. The reclocker may be utilized to recover and retime the data based on a known or derived clock signal. Though the eye of the signal may be open, signal recovery can be difficult even with a good reclocker circuit. In addition, as the signal travels though cross-point switches or interconnects, the signal pulses become more narrow due to jitter and eventually vanish. This results in the signal becoming non-recoverable. A jitter cleaner is used to retime the clock and retime each symbol so it can pass through band width limiting circuits. Prior art systems would often apply a reclocker after the cross-point switch because pulse shrinkage can occur in the cross-point switch, which can limit the reach at the input side.

To overcome the drawbacks of the prior art and provide additional benefit, an integrated equalizer and clock data recovery circuit is disclosed herein.

SUMMARY

To overcome the drawbacks of the prior art and provide additional benefits, an integrated system for adaptive equalization and jitter reduction is disclosed. In one embodiment input is configured to receive a video signal from a channel and an adaptive equalizer is configured to apply frequency specific signal modification to the received signal to present an equalized signal on an adaptive equalizer output. Also part of this embodiment is a bit rate detector configure to determine a bit rate of the video signal or the equalized signal and a jitter cleaner having a jitter cleaner input coupled to the adaptive equalizer output. The jitter cleaner is configured to process the equalized signal to reduce jitter in the equalized signal to create a jitter cleaner output. Also disclosed is a multiplexer configured to receive the equalized signal and the jitter cleaner output and, responsive to a control signal, output either the equalized signal or the jitter cleaner output. A status monitor is configured to compare the detected bit rate to a bit rate threshold, and a responsive to the detected bit rate being greater than the bit rate threshold, activate the jitter cleaner to processes the equalized signal and generate a control signal which causes the multiplexer to output the jitter cleaner output. Alternatively, if the detected bit rate is greater than the bit rate threshold then activating the jitter cleaner to process the equalized signal and generate a control signal which causes the multiplexer to output the jitter cleaner output.

In one embodiment the system further comprises an amplifier configured to amplify the signal prior to equalization by the adaptive equalizer. The jitter cleaner may comprise a clock and data recovery system. In one embodiment, the threshold bit rate is 1 Gb/s. In one configuration the channel is a coaxial cable having losses in excess of 30 dB at 1.5 GHz. The signal may include SMPTE standard data rates including 2.97 Gb/s and 1.485 Gb/s, or any other SMPTE data rate. It is also contemplated that a decision feedback equalizer be located between the adaptive equalizer and the jitter cleaner such that the decision feedback equalizer is configured to process the equalized signal to reduce noise in the equalized signal. As such, the invention may also include a noise detector configured to compare noise on the video signal or the equalizer output to a noise threshold and responsive to the comparing, activate or disable the decision feedback equalizer.

Also disclosed herein is a combined integrated circuit configured as an equalizer and clock/data recovery system contained within a single package comprising a package configured with an inner area and two more electrical pins and a die located in the inner area of the package, the die configured as an integrated circuit configured with the following elements. Also part of this embodiment is an equalizer configure to perform equalization of a received signal to generate an equalized signal, a clock/data recovery system configured to retime the equalized signal to create a retimed signal, and a bit rate detector configured to calculate a bit rate of the received signal. Also part of this embodiment is a comparator configured to compare the bit rate of the received signal to a bit rate threshold and a control circuit configured to selectively power down the clock/data recovery system if the bit rate of the received signal is below the bit rate threshold.

In one embodiment the die further includes a decision feedback equalizer configured to receive and process the equalized signal and present a decision feedback equalizer processed signal to the clock data recovery system. The control circuit may be further configured to power down the decision feedback equalizer based on one or more parameters of the received signal. In one configuration the system further includes a switch configured to receive the equalized signal and the retimed signal and if the clock/data recovery system is powered down, then the system will output the equalized signal and if the clock/data recovery system is not powered down, then the system will output the retimed signal. This control circuit may be part of a status monitor and the status monitor may be is configured to process the bit rate and generate the control signal. The status monitor or interface may be used to access one or more parameters of the equalizer and clock/data recovery system and monitor the equalized signal and retimed signal.

Also disclosed herein is a method for processing a video signal to perform noise and jitter reduction. In one embodiment this method comprises receiving a video signal and performing adaptive equalization on the video signal with an adaptive equalizer to create an equalized signal. Then the method provides the equalized signal to a switch and a retiming circuit. The method also compares one or more aspects of the equalized signal to a threshold and responsive to the comparing, either outputs the equalized signal or activates a retiming circuit to process the equalized signal to create a retimed signal, which is presented as the output.

In one embodiment the retime circuit comprises a clock/data recovery circuit including a phase lock loop circuit. The method may further comprise performing processing with a decision feedback equalizer to reduce noise on at least one of the video signal, the equalized signal, or the retimed signal. It is contemplated that performing adaptive equalization and processing the equalized signal to create a retimed signal occurs in the same integrated circuit within a package. This method of operation may also include generating a control signal which is presented to a switch or multiplexer, to control which input to the switch is output from the switch, such that the switch input includes at least the equalized signal and the retimed signal. The adaptive equalizer and retiming circuit may be coupled to a user interface or status monitor. The one or more aspects of the equalized signal may be a bit rate of the equalized signal or the video signal and the bit rate detector determines the bit rate.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

The invention disclosed is an integrated equalizer & retiming element which enables a lower power and lower cost solution, as compared to the prior art, for providing an integrated low jitter signal recovery solution. By integrating the equalizing and retiming element, printed circuit board (PCB) area requirements are reduced, and solution die area and power consumption is also reduced. There is also a performance benefit realized by avoiding the transmission of the equalized signal over a cable, bus or circuit board trace to get to the retiming element.

Due to random noise and inter symbolic interference (ISI), the pulse can shrink during transmission through a cable. When the post transmission pulses go through a cross-point, backplane equalizer, etc, the pulses become even narrower and can eventually vanish or appear indistinguishable. The smaller or vanished (indistinguishable) pulses cause bit errors. A jitter cleaner retimes all the pulses and makes them equal or have desired width of pulses. This ensured that signals can go through the bandwidth limited channels and be accurately recovered.

Figure 1:
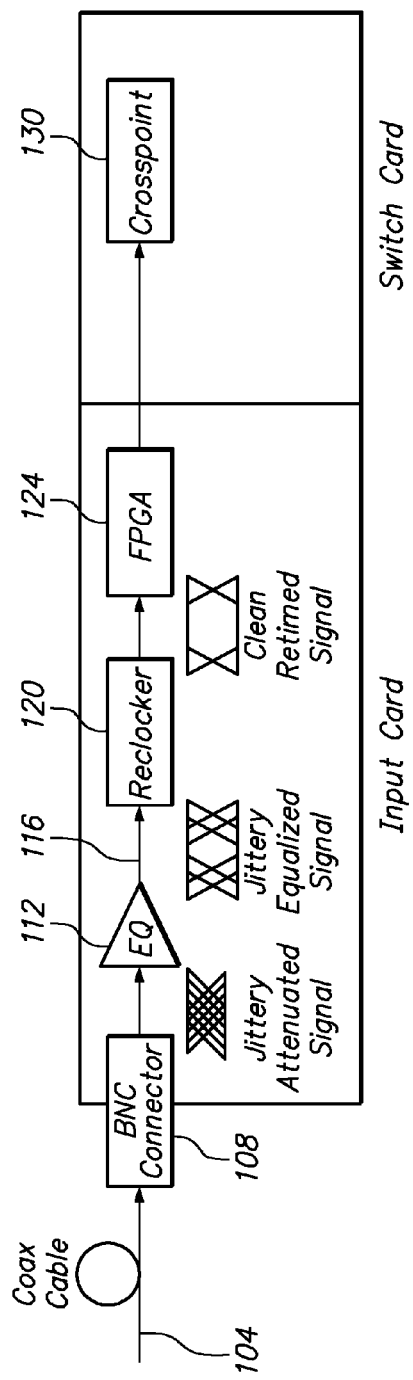
FIG. 1 is a block diagram of a video processing system.

FIG. 1 is a block diagram of a video processing system. In this embodiment, a signal is received over a cable 104, such as coax cable. In other embodiments other cables or paths may carry the signal including any metallic conductor, an optic channel, or a wireless path. The cable 104 connects to a connector 108. The connector 108 may comprise any type connector configured couple a cable 104 to a printed circuit board, integrated circuit, or any other element. In this example environment, the connector is a BNC connector.

The signal is then presented to an integrated circuit equalizer 112. The equalizer performs equalization on the signal to adjust the magnitude of the signal at one or more frequencies to correct frequency specific attenuation of the signal as the signal passes through the cable 104. The output of the equalizer is provided to path 116 which is external to the separate integrated devices 112, 120.

On a separate integrated circuit in the prior art is the reclocker 120, which may also be referred to as a retimer or CDR (clock data recovery) circuit. After processing by the equalizer 112, the signal is presented over one more separate channels on a printed circuit board or backplane to the reclocker 120. The reclocker processes the signal and generates a duplicate signal which has jitter removed or reduced. The output of the reclocker 120 is provided to a FPGA (field programmable gate array) 124. The output of the FPGA 124 connects to a switch 130, such as a crosspoint switch.

As a drawback to the system of FIG. 1, the equalizer 112 and the reclocker 120 are on separate integrated circuits. As a result there are two different and distinct integrated circuits. This adds additional cost and additional space requires, both of which are limited in modern printed circuit board design. If two integrated circuits are used there must also be the two packages which adds additional cost and potential for failure.

In addition, if two integrated circuits are used it is necessary to electrically connect the equalizer integrated circuit with the reclocker integrated circuit. To electrically connect each integrated circuit an electrically conductive path must be established from the integrated circuit, through the package, through the printed circuit board, and then into the second package, and into the second integrated circuit. This path, which is typically closely located with other conductors carrying signals and electrically unshielded, results in unwanted cross talk and coupling. This reduces the maximum bit rate for transmission or reduces the maximum cable length. Echo, reflection and other unwanted signal effects may also be introduced into the video signal.

Figure 2:
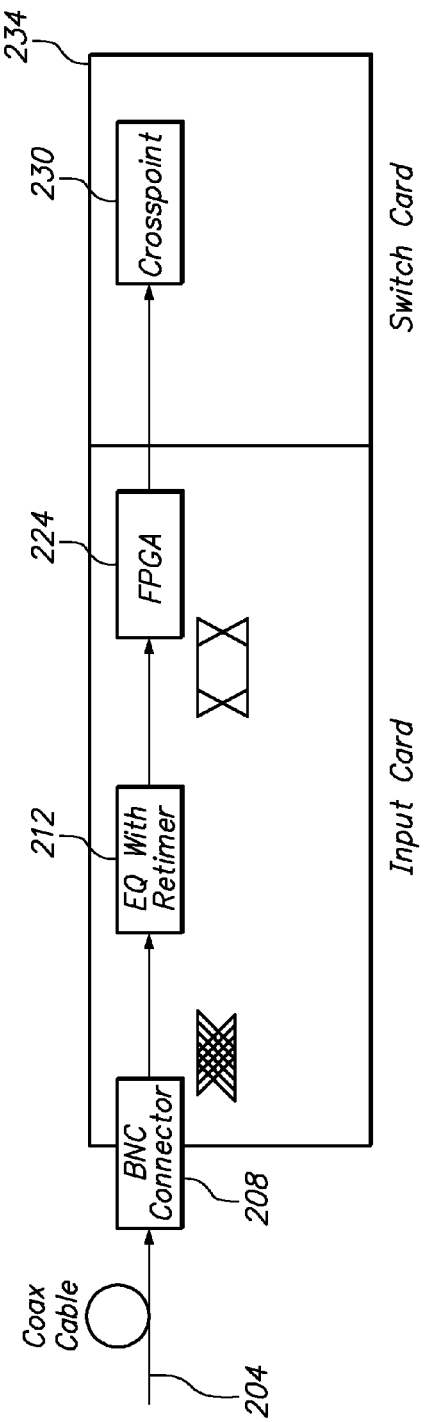
FIG. 2 is a block diagram of a combined video processing system.

FIG. 2 is a block diagram of a video processing system. In this example environment of use, a video signal is received from a remote location or from a source, such as a camera or other processing or video/image generation unit. Equipment from which the signal may be received include but are not limited to a switch, camera, monitor with pass through, amplifier, or any other element capable of transmitting or generating a video signal.

As shown in this embodiment a coaxial cable 204 connects to a connector 208, which in turn presents a signal to a combined equalizer and retime (jitter cleaner) 212. Although shown as a coax cable, any type channel may carry the signals including twisted pair channel, traces on printed circuit board, a backplane channel, a wireless channel, or any channel configured for long distance transmission of the signal such as over 75 meters. In this embodiment, the cable is terminated with and connects to the processing equipment with a BNC connector 208. In other embodiments, any other type connector may be used. The signal may operate at any SMPTE standard data rates including but not limited to 2.97 Gb/s, 1.485 Gb/s, 5.94 Gb/s, or 11.88 Gb/s.

The signal may undergo processing before connecting to the equalizer with an integrated retimer, such as with an analog front end (not shown), or connected directly to the combined equalizer and retime 212. The equalizer with retimer 212 (contained on a signal die and/or located within a single package) process the received signal to perform both equalization and retiming within a single integrated circuit.

Integrating both systems into a single integrated circuit avoids the need for separate discrete integrated circuits or separate circuit boards for each function. This in turn reduces cost and space requirements, and increase reliability due to a single package and associated connections and traces. In particular, between two different packages, which comprise the outer housing that contains a die, inner die having integrated circuits thereon, connection pins for conducting electrical signal, and the bond wires which connect the pin to the die, the pins can be in short supply. The pins are important to carry signals into and out of the package and die. By forming both the adaptive equalizer and the jitter cleaner on the same integrated circuit, the required pin count can be reduced, or other signals may be carried on the existing pins thereby increasing processing or monitoring capability. In this situation, it is possible to reduce the pin count for a driver pin and an input pin before the reclocking circuit (jitter cleaner).

In addition, as discussed below in greater detail, the system performance is increased as compared to the prior art. In addition, power reduction is also improved by having both elements in a single integrated circuit which allows for shared systems and reduced power consumption. As discussed below, additional benefits are also realized.

In one embodiment the adaptive equalizer and the jitter cleaner are electrically isolated to reduce crosstalk or coupling between the signal being processed by each element. These devices are thus placed on islands within the die to establish desired isolation.

In this embodiment, the output of the equalizer with retimer 212 is provided to a FPGA (field programmable gate array) 224, or other processing element. In other embodiments the system may be configured without the FPGA 224 and the output of the equalizer with retime 212 may connect directly to a switch 230, such as a crosspoint switch, or other element. In this embodiment the output of the processing system connects to a switch card 234 configured as a cross point switch. In other embodiments, the output may connect to processing elements in addition to or other than a crosspoint switch.

The signal presented to the equalizer with retimer contains phase jitter and other unwanted signal degradation, such as frequency specific attenuation due to passage through the channel. The signal output from the equalizer with retimer does not possess jitter and as a result the differences between each adjacent pulse may be clearly detected and identified.

Figure 3:
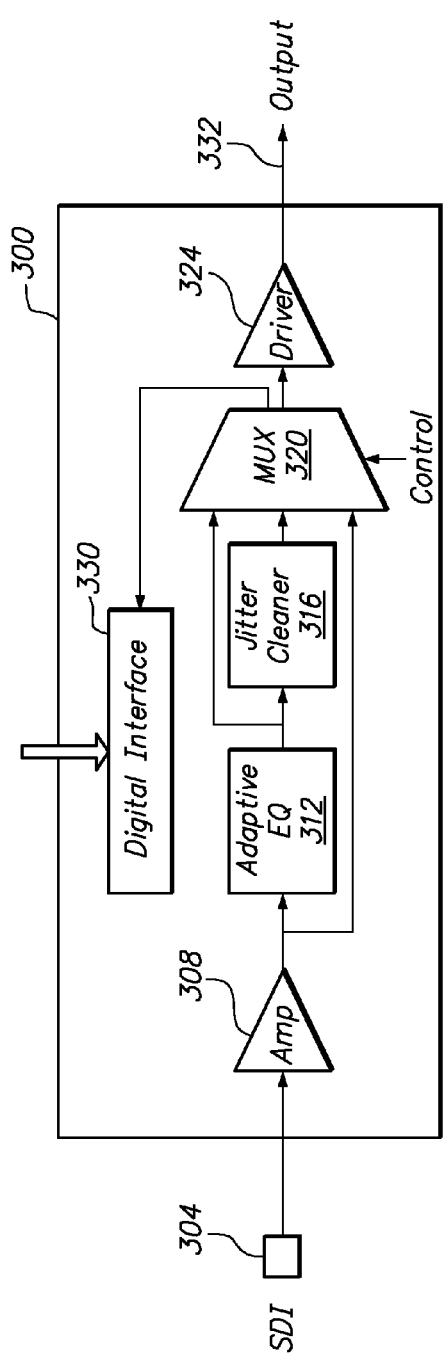
FIG. 3 is a detailed block diagram of the equalizer with integrated retimer.

FIG. 3 is a block diagram of the equalizer with retimer 300 as shown in FIG. 2. This is but one possible block diagram and in other embodiments other configurations may be arrived at by one of ordinary skill in the art. An input signal SDI 304 is provided to the combined equalizer with retimer. In this exemplary configuration the input comprises an SDI (serial digital interconnect) signal which is presented to an amplifier 308 or gain element. The amplifier 308 increases the magnitude of the signal for processing by the subsequent processing elements. The output of the amplifier also connects to a multiplexer 320 as shown. An analog front end (not shown) may also be part of one or more embodiments to perform processing in the analog domain, or the system described herein may be part of the analog front end (AFE).

The amplified signal is provided to an adaptive equalizer 312. The adaptive equalizer 312 may comprise one or more filters or gain elements which are configured to selectively amplify, such as on a frequency specific basis, or attenuate the signal to account for frequency specific attenuation of the channel. The systems described herein include auto detection to automatically adjust for and operate with signals of any bit rate.

The output of the adaptive equalizer 312 connects to a jitter cleaner 316 and the multiplexer as shown. The jitter cleaner 316 comprises any device configured to reduce or eliminate jitter in an electrical or optic signal. In one embodiment the jitter cleaner comprises or includes a clock data recovery (CDR) circuit, re-clocker which may include a phase lock loop, slicer, or any other device configured to reduce or eliminate jitter. The terms clock data recovery circuit, re-clocker, and jitter cleaner may be used interchangeably herein.

The output of the jitter cleaner 316 connects to the multiplexer 320. As a result, in this embodiment the multiplexer 320 receives three inputs: the amplified signal, the adaptive equalizer 312 output, and the jitter cleaner 316 output. Responsive to a control signal, the multiplexer 320 may output any of these three signals on either of the two outputs.

In other embodiments the multiplexer 320 may not be included, or it may only output a single output to the driver. The control signal may be generated from a processor or control logic that is within the equalizer with retimer 300, or external to the equalizer with retimer 300. In one embodiment the control signal to the multiplexer 320 is generated or received by the interface 330.

In the embodiment shown, having the multiplexer 320 with two outputs, a first output connects to a driver 324. The driver 324 is configured to amplify and output the equalized and jitter cleaned signal at a power level suitable for downstream processing or transmission on an output 332. A second output connects to a digital interface 330, which provides an interface for a user or a secondary processing or diagnostic system. The digital interface 330, in connection with rest of the system, may be used to create a diagnostic signal, such as test patterns for channel analysis, or to allow access to the system setting or system performance parameters.

In one configuration, one or more of the three different signals input to the multiplexer 320 may be processed for diagnostics purposes or to evaluate the channel, such as the cable. For example, the amplified signal may be analyzed to determine the channel's transfer function or to determine the quality of the channel. Likewise, the amplified signal may be compared to either of the equalized signal or the jitter cleaned signal to determine the amount of jitter or attenuation by comparing these signals.

It is also contemplated that if the amplified signal contains nominal or a moderate amount of jitter or frequency specific attenuation, the either or both of the adaptive equalizer 312 and/or the jitter cleaner 316 may be shut down or disabled to reduce power consumption. For example, if the signal was transmitted only a short distance, then the signal may not require jitter removal, such as with a CDR system, and as a result, these processing blocks may be shut down to reduce power consumption. The multiplexer 320 may then output the signal having no equalization or no jitter correction. It is contemplated that in some embodiments the adaptive equalizer 312 may remain on at all times.

Figure 4:
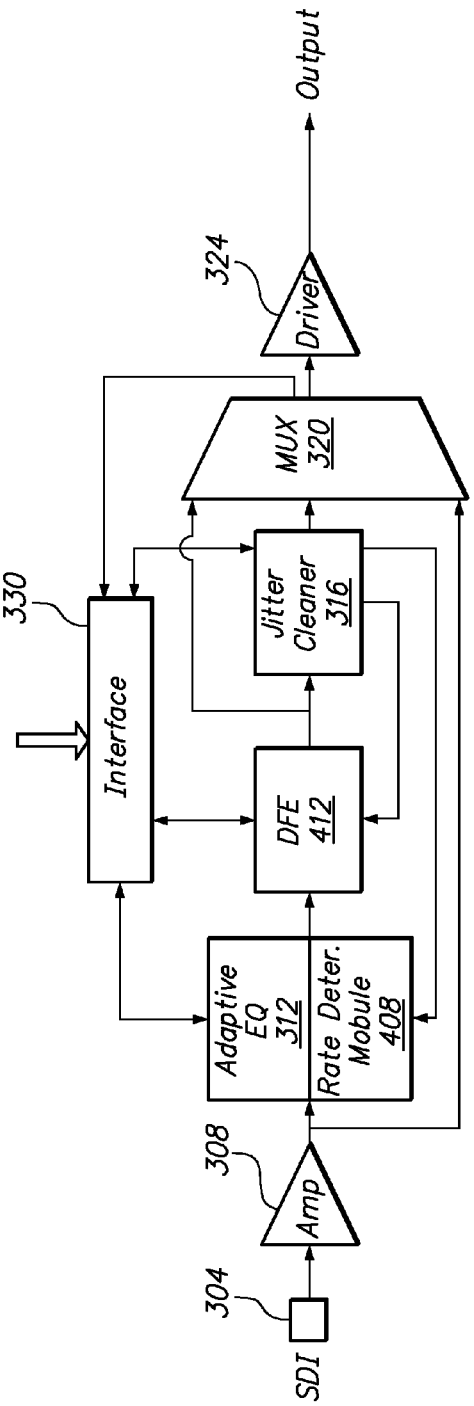
FIG. 4 is block diagram of the equalizer as shown in FIG. 3 with decision feedback equalizer.

FIG. 4 illustrates a block diagram of a combined equalizer and jitter cleaner with integrated decision feedback equalizer. This is but one example configuration of an adaptive equalizer and jitter cleaner that also includes a decision feedback equalizer (DFE). Other embodiments with the DFE arranged at different locations in relation to the other circuitry are possible. As compared to FIG. 3, common elements are identified with identical reference numbers although such elements are adapted to operate in the configuration of FIG. 4.

As shown in FIG. 4, the adaptive equalizer 312 also includes or operates in connection with a rate determination module 408. The rate determination module monitors the received signal and determines the bit rate, or other rate unit, for the incoming signal. In one embodiment the bit rate is calculated by detecting the number of rising of falling edges during a predetermined time period. As discussed below in greater detail the bit rate may be used to control one or more other functions. In this configuration the rate determination module 408, which is part of the adaptive equalizer 312, receives a feedback signal from the jitter cleaner 316.

The output of the adaptive equalizer 312 feeds into a decision feedback equalizer (DFE) 412. The DFE is a filter that uses feedback of detected symbols or signal levels, in addition to optional conventional equalization of future symbols or signals. Some embodiments may use predefined training sequences to provide reference points for the adaptation process of the DFE coefficients. DFE processing is known by those of ordinary skill in the art and as a result is not discussed in great detail herein. The DFE also receives a feedback signal from the jitter cleaner 316 as shown. Using this feedback signal the coefficients within the DFE 412 may be accurately adapted and dynamically updated during operation to achieve optimal operation. The DFE 412 provides the benefit of reducing or eliminating noise that coupled onto or otherwise is corrupting the signal. This is in contrast to the adaptive equalizer 312 which accounts for frequency specific attenuation to the signal in the channel.

The output of the DFE is presented to the jitter cleaner 316 for processing as described above to generate a signal that is not only processed for frequency specific attenuation and noise but also jitter to establish a signal having a fully open signal eye.

In this embodiment the interface 330 may be in communication with one or more of the adaptive equalizer 312, the DFE 412, jitter cleaner 316, and the multiplexer 320. As described above, the interface 330 enable access to one or more of these systems by a user or by other systems in the communication device.

Figure 5:
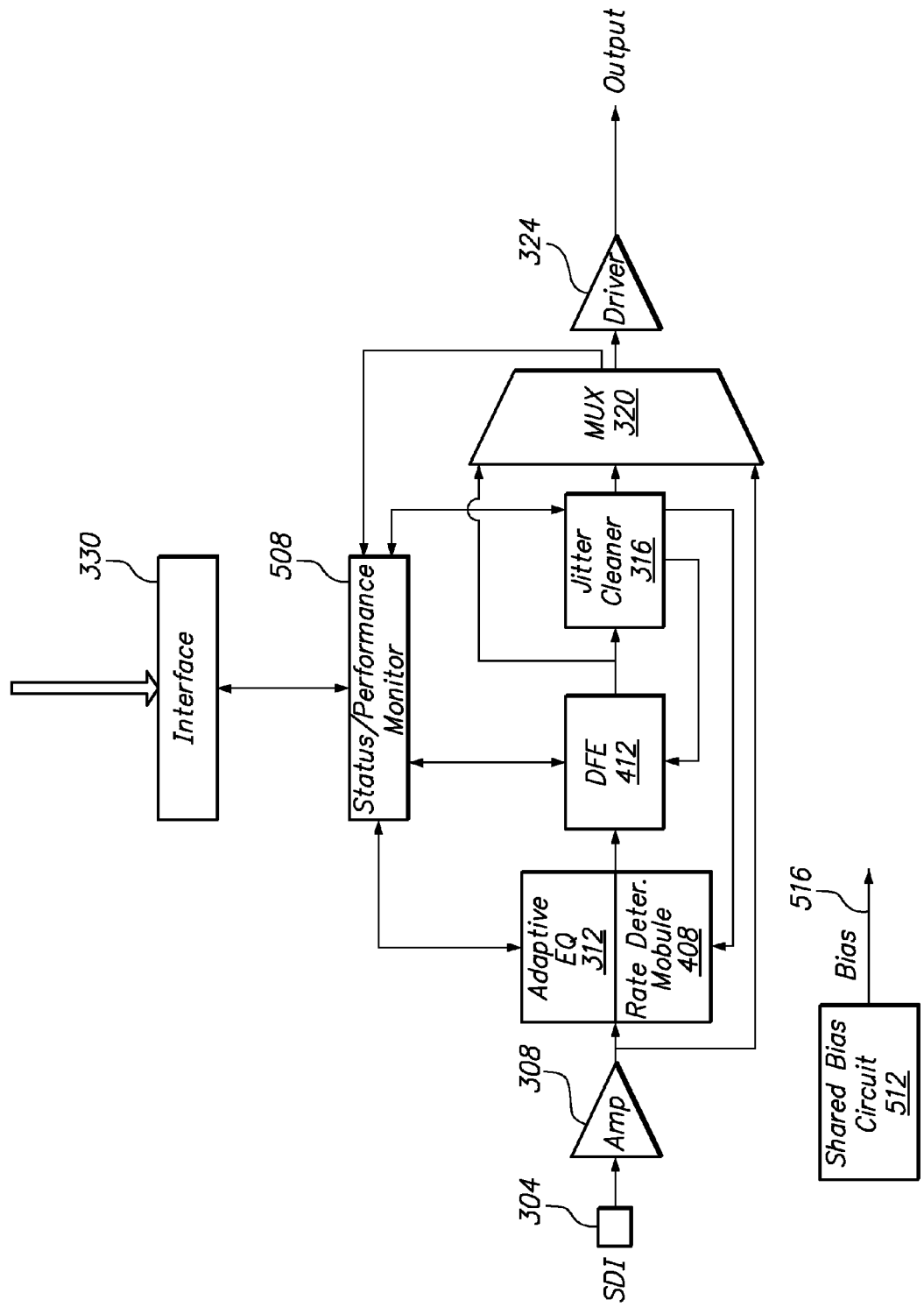
FIG. 5 is block diagram of the equalizer as shown in FIG. 4 with a status and performance monitoring module.

FIG. 5 illustrates a block diagram of a combined equalizer and jitter cleaner with integrated decision feedback equalizer. This is but one example configuration of an adaptive equalizer and jitter cleaner that also includes a decision feedback equalizer (DFE) and a status/performance monitor with shared biasing. Other embodiments with the status/performance monitor arranged at different locations in relation to the other circuitry are possible. As compared to FIGS. 3 and 4, common elements are identified with identical reference number although such elements are adapted to operate in the configuration of FIG. 5.

In this example embodiment a status/performance monitor 508 is configured to be in communication with or between the interface 330 and the other components 312, 412, 316. The status/performance monitor 508 is configured to monitor one more aspects of operation of the adaptive equalizer 312, DFE 412, and jitter cleaner 316. The status and performance monitor 508 may comprise control logic, processor, ASIC, FPGA, or any other device or system, with or without software, configured to perform as described herein.

In one embodiment the status/performance monitor 508 is configured to monitor one or more aspects of operation and responsive thereto shut down one or more elements of the system to reduce power consumption. For example, the rate determination module 408 determines the bit rate and the status and performance monitor 508 may then compare the bit rate to a threshold value. The threshold value is a bit rate below which certain devices may be turned off or disabled to reduce power consumption. If the actual bit rate is below a threshold, the status and performance monitor 508 can turn off the DFE 412, the jitter cleaner 316, or both. While the adaptive equalizer 312 may be maintained active, it is contemplated that some aspects of the adaptive equalizer may be shut down or reductions in processing may occur. In one embodiment the threshold value is 1 gigabits per second. In other embodiment other bit speeds may be selected for the threshold value. In one embodiment the adaptive equalizer may also be disabled to reduce power consumption while in other embodiments the adaptive equalizer is active at all times.

In another embodiment, the bit rate signal or other signal information is provided to the jitter cleaner 316 directly and the jitter cleaner determines whether to disable operations or processes the output from the adaptive equalizer 312. It is also contemplated that instead of a multiplexer or switch, the signal may be passed through the jitter cleaner 316 directly without jitter cleaning processing, which may be disabled based on the bit rate to reduce power consumption. Alternatively, the equalizer 312 could be configured to perform the detecting of the bit rate, comparing to a threshold, and the disabling of the jitter cleaner 316. It is also contemplated that a feedback loop may be implemented to monitor the bit rate and control operation of the jitter cleaner. It is also disclosed herein that differing degrees or levels of jitter reduction may be implemented to only perform the amount of jitter reduction required to meet specification while also reducing power consumption.

It is further contemplated that the status and performance monitor 508 may serve as an automated controller or a user input based controller to monitor one or more aspects of operation of the adaptive equalizer 312, DFE 412 and jitter cleaner 316 to coordinate and improve operation. In one embodiment, the status and performance monitor 508 receives and processes input from the adaptive equalizer 312, DFE 412 and jitter cleaner 316 to thereby control operation of one or more of these devices of improve performance or reduce power consumption. The input to the status and performance monitor 508 may include coefficients, input signals, output signals, or any other setting or parameter. By monitoring and optionally adjusting one or more setting or aspect of operation of the adaptive equalizer 312, DFE 412 and jitter cleaner 316 in a coordinated manner, improved performance and/or power savings may be realized in a way not possible in the prior art.

The status and performance monitor 508 is also coupled to the interface 330. This provides for user access to not only the adaptive equalizer 312, DFE 412, and jitter cleaner 316 signals and settings, but also the settings and data in the status and performance monitor 508. Thus, the user can set the thresholds, settings, and system optimization routines to be executed and set by the status and performance monitor 508.

Also shown in FIG. 5 is a shared bias circuit 512 having an output 516 that connects to the elements of FIG. 5 that require biasing such as, but not limited to, one or more of the amplifier 308, equalizer 312, DFE 412, jitter cleaner 316 and the driver 324. To reduce complexity a direct connection of the bias output 516 to each element is not shown in FIG. 5 however one or more outputs may be provided from the shared bias circuit 512 depending on the biasing requirements of the individual elements of FIG. 5. By having a shared bias circuit, power savings, space savings, and costs savings are realized over the prior art. In prior art systems, two biasing systems were required for biasing the separate integrated circuits, namely the adaptive equalizer IC and the separate jitter cleaner IC, which increased cost, size, and power consumption.

In addition, the status monitor and/or the user interface may also be shared by both the adaptive equalizer 312 and the jitter cleaner 316. By having both of these elements (adaptive equalizer and the jitter cleaner) on a single integrated circuit, the system may utilize a shared status and performance monitor and/or the user interface as compared to prior art systems which required two status and performance monitors and two user interfaces. This further reduces power consumption, space requirements, and cost.

Figure 6:
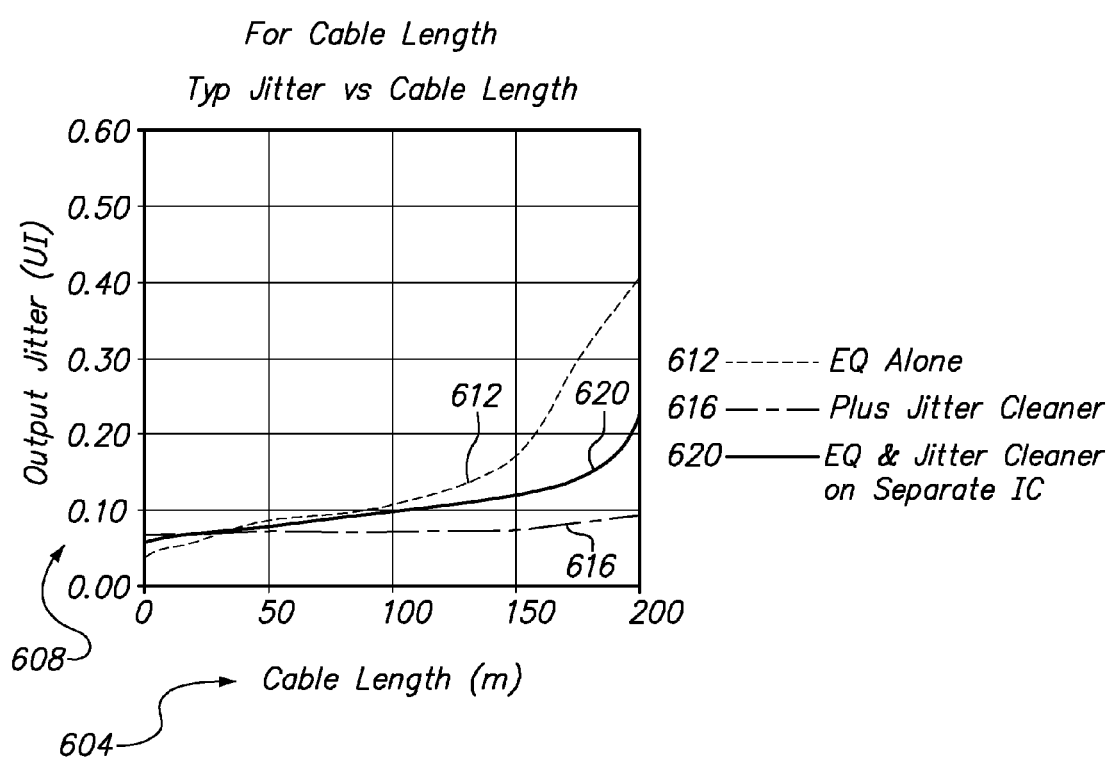
FIG. 6 is a signal plot of jitter verses cable length for a signal processed under the prior art and a signal processed by a combined equalizer and jitter cleaner.

FIG. 6 is a signal plot of jitter verses cable length for signals processed under both the prior art system shown in FIG. 1 and a signal processed with the combined equalizer and jitter cleaner shown in FIG. 2. The horizontal axis 604 represents cable length in meters while the vertical axis 608 represents output jitter. In this exemplary plot the signal without the integrated jitter cleaning shows a marked increase in output jitter at cable lengths greater than one hundred meters. In contrast, the signal which is equalized and jitter cleaned has a generally constant and low jitter level across a wide range of cable lengths.

As shown, for signal plot 612 which undergoes processing by only the adaptive equalizer, the output jitter at cable lengths beyond 100 meters rises to unacceptable levels, particularly beyond 125 meters. As a result, when jitter cleaner processing is added and the signal 620 undergoes jitter reduction, the output jitter drops. However, even for longer cable lengths, the jitter is undesirably high. The third signal plot 616 illustrates a signal that undergoes both adaptive equalization and processing by the jitter cleaner when both the adaptive equalizer and jitter cleaner are both located on a single integrated circuit. As can be seen from signal plot 616, the resulting signal processing results in a low jitter signal even at cable lengths up to 200 meters. This is a significant advantage over the prior art.

By implementing both the adaptive equalizer and the jitter cleaner on the same integrated circuit the signal path does not require that the signal from the adaptive equalizer pass out of the adaptive equalizer die, through the package, through the circuit board, and then into the jitter cleaner package, bond wires and die. This path introduces signal degradation and other unwanted affects, such as reflection, signal loss, and trace noise. By placing both the adaptive equalizer and jitter cleaner on a single die in a single package, this prior art signal degradation and the unwanted effects can be avoided.

Figure 7:
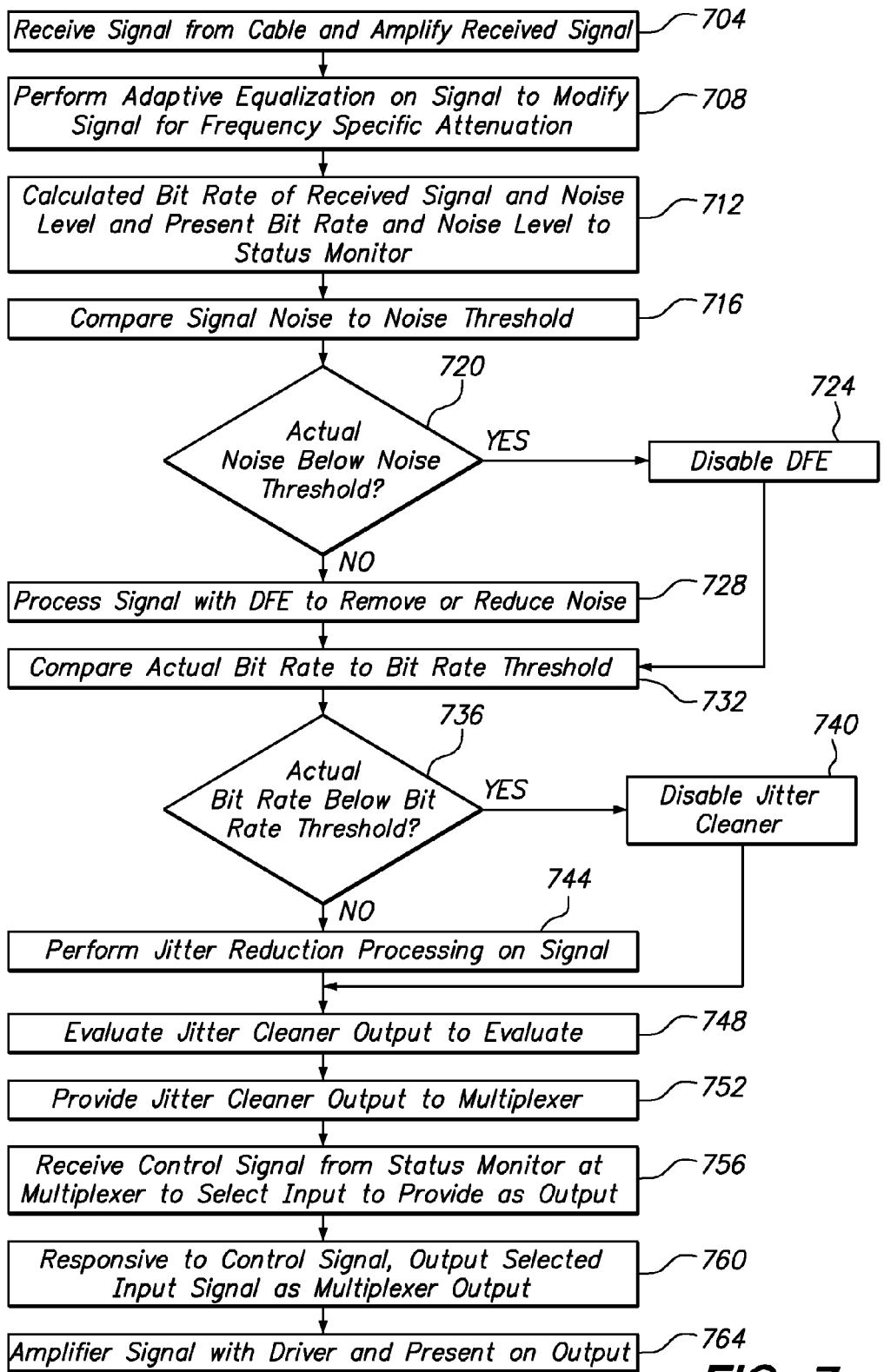
FIG. 7 illustrates an operational flow diagram of an exemplary method of operation.

FIG. 7 illustrates an operational flow diagram of an example method of operation. This is but one possible method of operation and as such, other methods of operation are possible that do not depart from the scope of the invention as described and claimed herein.

As shown in FIG. 7, the operation starts at a step 704 by receiving a signal from the cable and amplifying the received signal to a magnitude suitable for subsequent processing. Additional processing may occur such as in an analog front end. At a step 708 the system performs adaptive equalization on the signal to modify the signal for frequency specific attenuation that occurred as a result of the signal passing through the cable, which may be referred to herein as the channel. As is understood, different channels attenuate certain signal frequencies more that other signal frequencies. The length of the channel also affects the level of attenuation.

At a step 712 the rate determination module, or rate detector, calculates the bit rate, signal rate or frequency value. This may occur by monitoring peaks, transitions, rising edges, or falling edges of the received signal in relation to a known timer period. The rate, such as bit rate, of the received signal is provided to the status monitor or user interface.

At step 712, the noise level (such as SNR) of the received signal may also be detected by the equalizer, rate detector, or other element and this nose information may be provided to the status monitor.

Continually or periodically, the status monitor compares the signal noise to a noise threshold. This occurs at a step 716. The noise threshold is one or more values that define noise levels to which the actual noise value is compared. If, at step 720, the actual noise level is above the threshold, then the operation advances to a step 728 for processing by the DFE to reduce noise. If the noise level is below the noise threshold, then the operation advances to step 724.

At step 724 the system, such as the status monitor or interface, may optionally disable the DFE to reduce power consumption and reduce heat generation. This may also increase system operation speed. Because the noise level is below the threshold, the signal noise is acceptably low and there is no need for processing of the signal by the DFE. It is contemplated that the user or system may change the noise threshold, or a different noise threshold may be established for different bit rates or other operating factors.

Alternatively, if the actual noise is not below the threshold noise level, then the operation advances to step 728. At step 728 the DFE processes the signal from the adaptive equalizer to remove or reduce noise that is part of the signal. In other embodiments, processing other than or in addition to processing by a DFE may occur. Instead of or in addition to a DFE, other devices such as a multiple tap feed forward equalizer may be part of the system.

At a step 732 the system compares the actual bit rate to a bit rate threshold to determine if the actual bit rate is below the threshold. The bit rate threshold is a value at which the processing may be increased or decreased to reduce power consumption. If the actual bit rate is below the bit rate threshold, then it is contemplated that the bit rate is slow enough that processing may be reduced without effecting signal processing or increasing the bit error rate or signal detection. It is contemplated that the comparison may occur in the status monitor, the interface, or the adaptive equalizer.

If at decision step 736 the actual bit rate is below the bit rate threshold, then the operation advances to a step 740 and the system, such as the status monitor or interface, disables the jitter cleaner. This reduces power consumption and heat generation. Because the bit rate is low, the processes of the jitter cleaner may not be required. In this situation the signal may be routed through the jitter cleaner, but without processing, or the multiplexer may be controlled to output the same signal that is presented as the input to the jitter cleaner, thereby bypassing the jitter cleaner.

Alternatively, if at step 736 the status monitor or interface determines that the actual bit rate is above the bit rate threshold, then the operation advances to a step 744 and the signal is presented to an operational jitter cleaner, i.e. jitter reduction is performed. The jitter cleaner processes the signal to reduce or remove jitter.

Turning to FIG. 7B, at a step 748 the output of the jitter cleaner is evaluated by the status monitor or the interface to evaluate the signal quality output by the jitter cleaner, such as but not limited to the signal eye, to determine if the settings and parameters meet specification or if adjustments to one or more aspects of the adaptive equalizer, DFE, or jitter cleaner should be made to improve one or more aspects of the signal quality. These adjustments include but are not limited to a bias towards over or under equalization, amount of DFE, precursor correction of multiple tap feed forward equalizer.

At a step 752, the jitter cleaner outputs the processed signal to a multiplexer, or optionally to other device such as a switch or an output pin from the integrated circuit on which the adaptive equalizer and the jitter cleaner are both located. At a step 756 the multiplexer receives a control signal from the status monitor, or other control logic or other controller. The control signal defines which input signal the multiplexer will present as its output. As discussed above, depending on the noise and jitter associated with the signal, the multiplexer may present different input signals as the output.

At a step 760 the multiplexer, responsive to the control signal, outputs the selected input signal as the output from the multiplexer. At step 764 the signal from the multiplexer is presented to a driver for amplification and then presented on an output of the integrated circuit.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An integrated system for adaptive equalization and jitter reduction comprising:
  an input configured to receive a video signal from a channel;
  an adaptive equalizer configured to apply frequency specific signal modification to the received signal to present an equalized signal on an adaptive equalizer output;
  a bit rate detector configure to determine a detected bit rate of the video signal or the equalized signal;
  a jitter cleaner having a jitter cleaner input coupled to the adaptive equalizer output, the jitter cleaner configured to process the equalized signal to reduce jitter in the equalized signal to create a jitter cleaner output;
  a multiplexer configured to receive the equalized signal and the jitter cleaner output and, responsive to a control signal, output either the equalized signal or the jitter cleaner output; and
  a status monitor configured to:
    compare the detected bit rate to a bit rate threshold;
    responsive to the detected bit rate being greater than the bit rate threshold, activate the jitter cleaner to processes the equalized signal and generate a control signal which causes the multiplexer to output the jitter cleaner output; and
    responsive to the detected bit rate being greater than the bit rate threshold, activate the jitter cleaner to processes the equalized signal and generate a control signal which causes the multiplexer to output the jitter cleaner output.

2. The system of claim 1 further comprising an amplifier configured to amplify the signal prior to equalization by the adaptive equalizer.

3. The system of claim 1 wherein the jitter cleaner comprises a clock and data recovery system.

4. The system of claim 1 wherein the threshold bit rate is 1 Gb/s.

5. The system of claim 1 wherein the channel is a coaxial cable having losses in excess of 30 dB at 1.5 GHz.

6. The system of claim 1 wherein the signal is at SMPTE standard data rates including 5.94 Gb/s, 2.97 Gb/s and 1.485 Gb/s.

7. The system of claim 1 further comprising a decision feedback equalizer located between the adaptive equalizer and the jitter cleaner, the decision feedback equalizer configured to process the equalized signal to reduce noise in the equalized signal.

8. The system of claim 7 further comprising a noise detector configured to compare noise on the video signal or the equalizer output to a noise threshold and responsive to the comparing, activate or disable the decision feedback equalizer.

9. A combined integrated circuit configured as an equalizer and clock/data recovery system contained within a single package comprising:
  a package configured with an inner area and two or more electrical pins;
  a die located in the inner area of the package and electrically connected to the pins of the package, the die configured as an integrated circuit configured with the following elements:
    an equalizer configure to perform equalization of a received signal to generate an equalized signal;
    a clock/data recovery system configured to retime the equalized signal to create a retimed signal;
    a bit rate detector configured to calculate a bit rate of the received signal;

a comparator configured to compare the bit rate of the received signal to a bit rate threshold; and a control circuit configured to selectively power down the clock/data recovery system when the bit rate of the received signal is below the bit rate threshold.

10. The system of claim 9 wherein the die further includes a decision feedback equalizer configured to receive and process the equalized signal and present a decision feedback equalizer processed signal to the clock data recovery system.

11. The system of claim 9 further comprising a switch configured to receive the equalized signal and the retimed signal and if the clock/data recovery system is powered down, then output the equalized signal and if the clock/data recovery system is not powered down, then output the retimed signal.

12. The system of claim 9 wherein the control circuit is part of a status monitor, the status monitor is configured to process the bit rate and generate the control signal.

13. The system of claim 9 further comprising a status monitor with interface to access one or more parameters of the equalizer and clock/data recovery system and monitor the equalized signal and retimed signal.

14. The system of claim 10 wherein the control circuit is further configured to power down the decision feedback equalizer based on one or more parameters of the received signal.

15. A method for processing a video signal to perform noise and jitter reduction, the method comprising:

receiving a video signal;

performing adaptive equalization on the video signal with an adaptive equalizer to create an equalized signal;

providing the equalized signal to a switch and a retiming circuit;

comparing one or more aspects of the equalized signal to a threshold; and responsive to the comparing, either outputting the equalized signal or activating a retiming circuit to process the equalized signal to create and output a retimed signal.

16. The method of claim 15 wherein the retime circuit comprises a clock/data recovery circuit including a phase lock loop circuit.

17. The method of claim 15 further comprising performing processing with a decision feedback equalizer to reduce noise on at least one of the video signal, the equalized signal, or the retimed signal.

18. The method of claim 15 wherein the performing adaptive equalization and processing the equalized signal to create a retimed signal occurs within the same integrated circuit.

19. The method of claim 15 further comprising generating a control signal which is presented to a switch to control which input to the switch is output from the switch, such that the switch input includes at least the equalized signal and the retimed signal.

20. The method of claim 15 further comprising coupling the adaptive equalizer and retiming circuit to a user interface or status monitor.

21. The method of claim 15 wherein the one or more aspects of the equalized signal is a bit rate of the equalized signal or the video signal and a bit rate detector determines the bit rate.

* * * * *